US012492590B2

United States Patent
Kim et al.

(10) Patent No.: US 12,492,590 B2
(45) Date of Patent: Dec. 9, 2025

(54) INTEGRATED OPERATING APPARATUS FOR DIFFERENT TYPE GATES

(71) Applicants: Hyundai Motor Company, Seoul (KR); Kia Corporation, Seoul (KR)

(72) Inventors: Jang-Hoon Kim, Hwaseong-si (KR); Min-Hyoung Ahn, Suwon-si (KR); Jae-Yun Lee, Yangsan-si (KR); Dong-Hee Ma, Hwaseong-si (KR); Je-Yeon Kim, Seoul (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 231 days.

(21) Appl. No.: 18/354,814

(22) Filed: Jul. 19, 2023

(65) Prior Publication Data
US 2024/0159098 A1    May 16, 2024

(30) Foreign Application Priority Data
Nov. 15, 2022    (KR) .................. 10-2022-0152980

(51) Int. Cl.
*E05F 17/00*    (2006.01)

(52) U.S. Cl.
CPC ...... *E05F 17/004* (2013.01); *E05F 2017/005* (2013.01); *E05F 2017/008* (2013.01); *E05Y 2201/216* (2013.01); *E05Y 2201/246* (2013.01); *E05Y 2201/258* (2013.01); *E05Y 2201/47* (2013.01); *E05Y 2201/626* (2013.01); *E05Y 2201/718* (2013.01); *E05Y 2201/722* (2013.01); *E05Y 2800/205* (2013.01); *E05Y 2900/531* (2013.01)

(58) Field of Classification Search
CPC .............. E05F 17/004; E05F 2017/005; E05F 2017/008; E05F 15/635; B60J 5/0477; B60J 5/0498; B60J 5/06; B60J 5/047
See application file for complete search history.

(56) References Cited

U.S. PATENT DOCUMENTS 3,702,651 A * 11/1972 Saburo Fujita et al. .................... F16D 13/505
192/70.252
4,530,185 A * 7/1985 Moriya ................. E05F 15/603
49/300

(Continued)

FOREIGN PATENT DOCUMENTS

KR    20130086468 A    8/2013

*Primary Examiner* — Gregory J Strimbu
(74) *Attorney, Agent, or Firm* — Slater Matsil, LLP (57) ABSTRACT

An embodiment integrated operating apparatus for different types of gates includes a driving motor, a main shaft rotatable by the driving motor, a first clutch portion at a first side of the main shaft and configured to selectively transmit power to a first gate of a vehicle, the first clutch portion including a first clutch and a first gear selectively engaged with each other, and a second clutch portion at a second side of the main shaft and configured to selectively transmit power to a second gate of the vehicle, the second clutch portion including a second clutch and a second gear selectively engaged with each other, wherein the first and second gates are configured to be independently operated based on the first clutch portion being in an engaged state or a released state and the second clutch portion being in the engaged state or the released state.

20 Claims, 7 Drawing Sheets

(56) References Cited

U.S. PATENT DOCUMENTS

| | | | | |
|---|---|---|---|---|
| 5,688,019 A * | 11/1997 | Townsend | ............ | B60R 21/207 |
| | | | | 296/146.4 |
| 6,412,223 B1 * | 7/2002 | Hiebl | .................. | E05B 81/25 |
| | | | | 49/352 |
| 6,803,733 B1 * | 10/2004 | Shabana | ............... | E05F 15/692 |
| | | | | 296/146.12 |
| 7,469,768 B2 * | 12/2008 | Chino | .................... | B62D 1/163 |
| | | | | 180/405 |
| 7,644,540 B2 * | 1/2010 | Ichinose | ............... | E05F 15/627 |
| | | | | 49/340 |
| 2015/0015018 A1 | 1/2015 | Lee | | |
| 2021/0070227 A1 * | 3/2021 | Oji | .................. | E05F 15/41 |
| 2021/0172213 A1 * | 6/2021 | Cho | ...................... | B60J 5/10 |
| 2022/0242202 A1 * | 8/2022 | Murata | .................. | E05B 83/36 |
| 2022/0389746 A1 * | 12/2022 | Nishi | ...................... | B60J 5/0477 |
| 2024/0109493 A1 * | 4/2024 | Sakurai | ................ | B60J 5/0458 |

* cited by examiner

INTEGRATED OPERATING APPARATUS FOR DIFFERENT TYPE GATES

CROSS-REFERENCE TO RELATED APPLICATIONS

This application claims the benefit of Korean Patent Application No. 10-2022-0152980, filed on Nov. 15, 2022, which application is hereby incorporated herein by reference.

TECHNICAL FIELD

The present disclosure relates to an integrated operating apparatus for different types of gates that opens and closes different types of gates individually or simultaneously using a single motor.

BACKGROUND

Purpose-built vehicles (PBVs), which are attracting attention as a future mobility, employ various types of gates to meet various purposes.

SUMMARY

The present disclosure relates to an integrated operating apparatus for different types of gates. Particular embodiments relate to an integrated operating apparatus for different types of gates that opens or closes different types of gates individually or simultaneously using a single motor.

An embodiment of the present disclosure is directed to an integrated operating apparatus for different types of gates that is capable of simultaneously operating a sliding gate and a bed gate using a single motor or selectively operating any one of the sliding gate and the bed gate.

In accordance with an embodiment of the present disclosure, there is provided an integrated operating apparatus for different types of gates that includes a driving motor, a main shaft rotated by the driving motor, a first clutch portion installed at one side of the main shaft and configured to selectively transmit power to a first gate of a vehicle, and a second clutch portion installed on the other side of the main shaft and configured to selectively transmit power to a second gate of the vehicle, wherein the first clutch portion and the second clutch portion each includes a gear and a clutch that are installed to be engaged with each other, and the first gate and the second gate are independently operated according to whether the gear and the clutch are engaged or released.

The integrated operating apparatus may further include a body in which the main shaft is installed, and the first clutch portion and the second clutch portion may be disposed at both sides of the body.

Each of the first clutch portion and the second clutch portion may include a clutch installed at the main shaft in a spline manner, a gear selectively engaged with the clutch and configured to operate at least one of the first gate and the second gate when engaged with the clutch, a spring configured to elastically support the clutch to be engaged with the gear, and an electromagnet configured to slide the clutch on the main shaft to separate the clutch from the gear when power is applied and the electromagnet is magnetized.

The clutch may be made of a permanent magnet configured to generate a repulsive force with respect to the electromagnet when the electromagnet is magnetized.

The first clutch portion may include a first gear engaged with a first clutch installed at the main shaft, and the first gear may be connected to a sliding gate driver configured to operate a sliding gate which is opened and closed in a sliding manner in the vehicle.

A rack gear may be formed inside the sliding gate, and the sliding gate driver may include a sliding gate operating shaft engaged with the first clutch portion and rotated by the first clutch portion and an interlocking shaft engaged with the sliding gate operating shaft and engaged with the rack gear.

The sliding gate operating shaft may include an input gear portion engaged with the first output gear which is engaged with the first gear and an output gear portion engaged with the interlocking shaft, and the interlocking shaft may include an input gear portion engaged with the sliding gate operation shaft and an output gear portion engaged with the rack gear.

The rack gear may be formed on each of an upper portion and a lower portion of the sliding gate, and an upper end and a lower end of the interlocking shaft may be engaged with the rack gear.

The second clutch portion may be provided with a second gear engaged with a second clutch installed at the main shaft, and the second gear may be connected to a bed gate driver configured to open and close a bed gate whose lower portion is hinge-coupled to the vehicle.

The bed gate driver may include a reduction gear engaged with a second output gear which is engaged with the second gear and a bed gate operating lever having one side engaged with the reduction gear and the other side linked and connected to the bed gate by a connection lever.

The bed gate operating lever may include a sector gear engaged with the reduction gear and a lever linked and connected to the connection lever.

DETAILED DESCRIPTION OF ILLUSTRATIVE EMBODIMENTS

Hereinafter, an integrated operating apparatus for different types of gates according to embodiments of the present disclosure will be described in detail with reference to the accompanying drawings.

Figure 1:
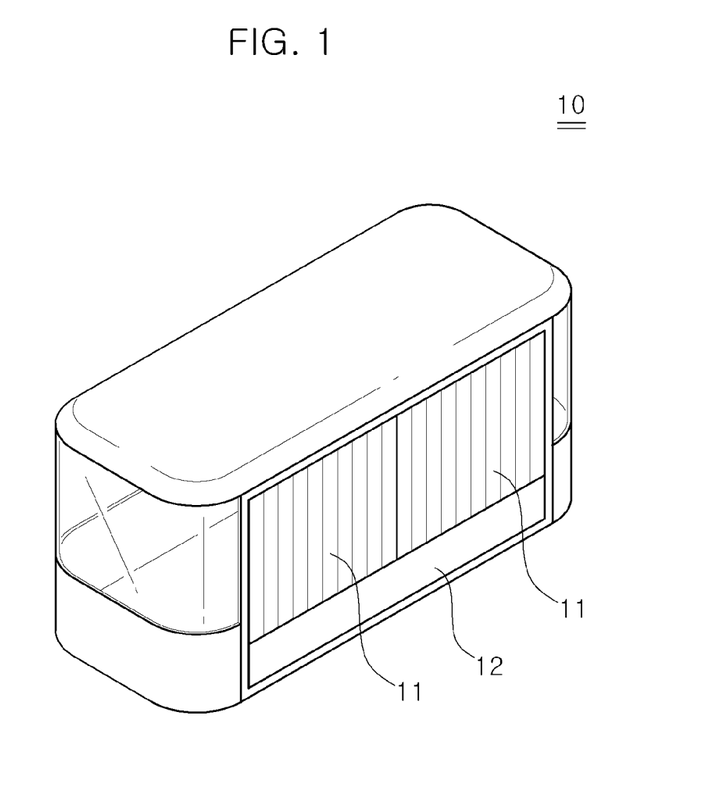
FIG. 1 is a perspective view illustrating a state in which a sliding gate and a bed gate are closed in a purpose-built vehicle (PBV).
Figure 2:
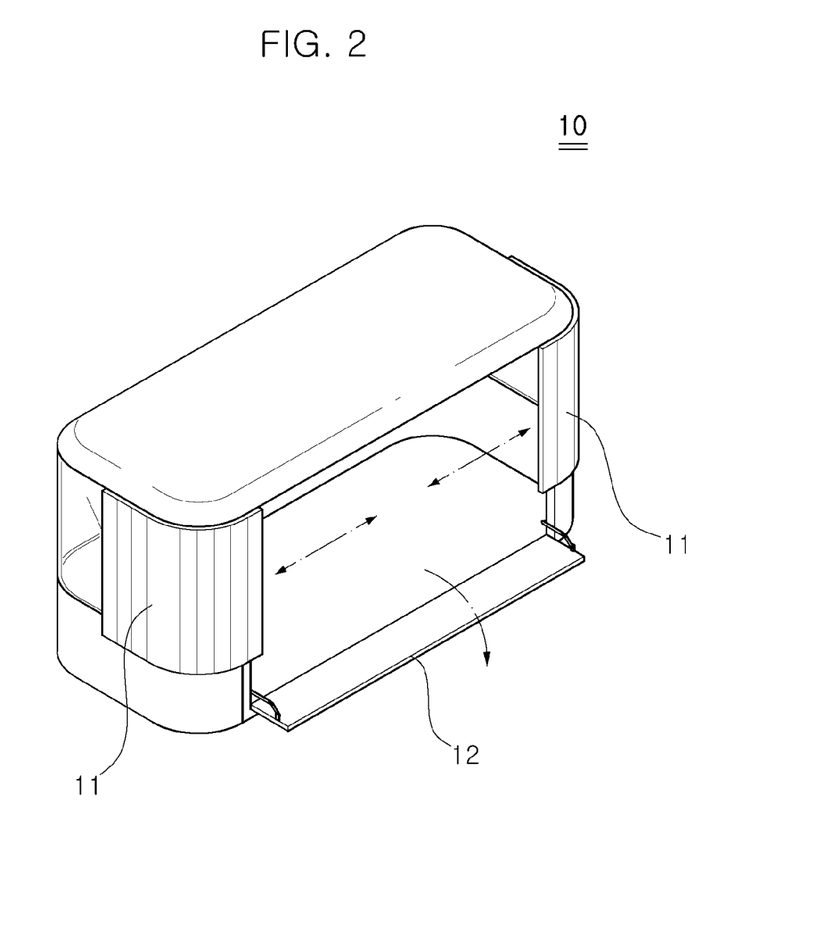
FIG. 2 is a perspective view illustrating a state in which the sliding gate and the bed gate are opened in the PBV.

For example, as shown in FIGS. 1 and 2, a PBV 10 includes a sliding gate 11 opened and closed in a sliding manner and a bed gate 12 opened and closed by being pivoted about a hinge point, in which the bed gate 12 is disposed at an upper portion and/or a lower portion, respectively. One of the sliding gates 11 and the bed gate 12 is selectively opened and closed or both gates are opened and closed, as necessary.

Since two types of gates, that is, the sliding gate 11 and the bed gate 12 are required, operating apparatuses for opening and closing the gates are also provided separately.

The sliding gate 11 and the bed gate 12 are not always operated while driving, but the sliding gate 11 and the bed gate 12 are only opened or closed when needed. Since an operating apparatus for each gate should be provided, it is inevitably disadvantageous in terms of a production cost and a weight of the PBV 10.

Figure 3:
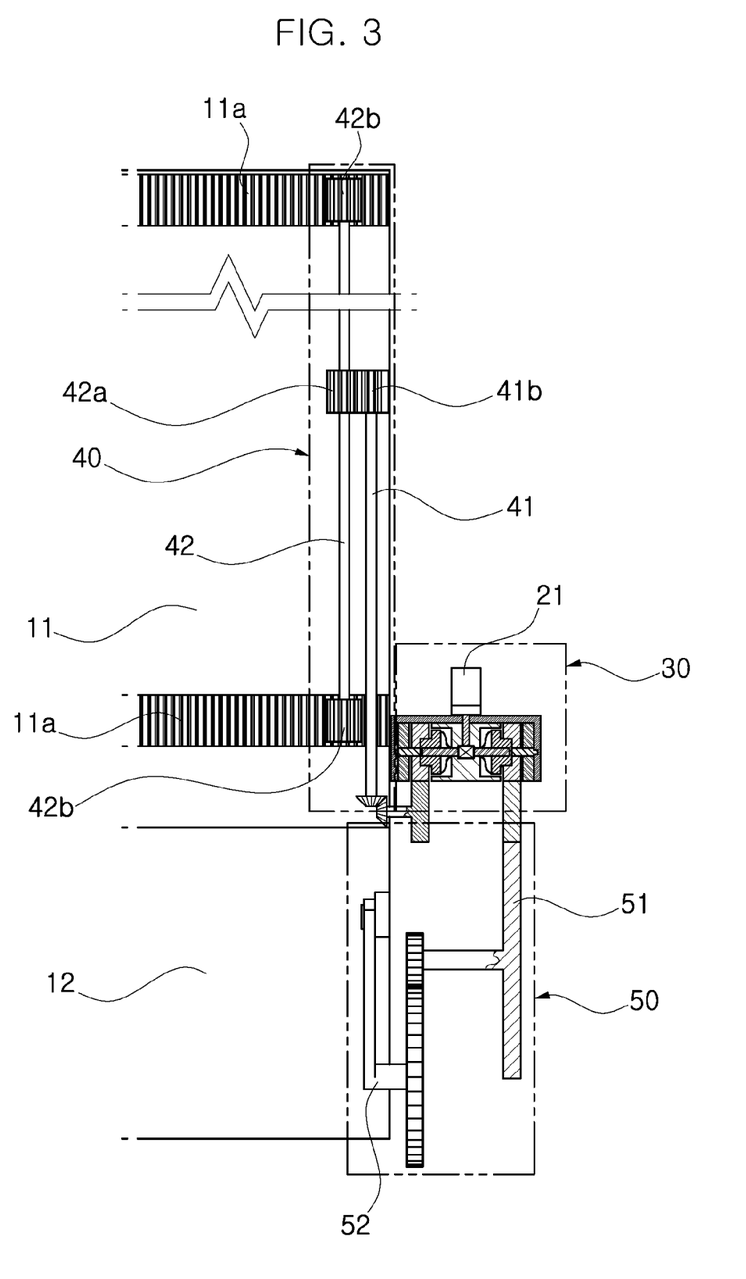
FIG. 3 is a schematic diagram illustrating a state in which an integrated operating apparatus for different types of gates is connected to a sliding gate driver and a bed gate driver of the gates according to embodiments of the present disclosure.
Figure 4:
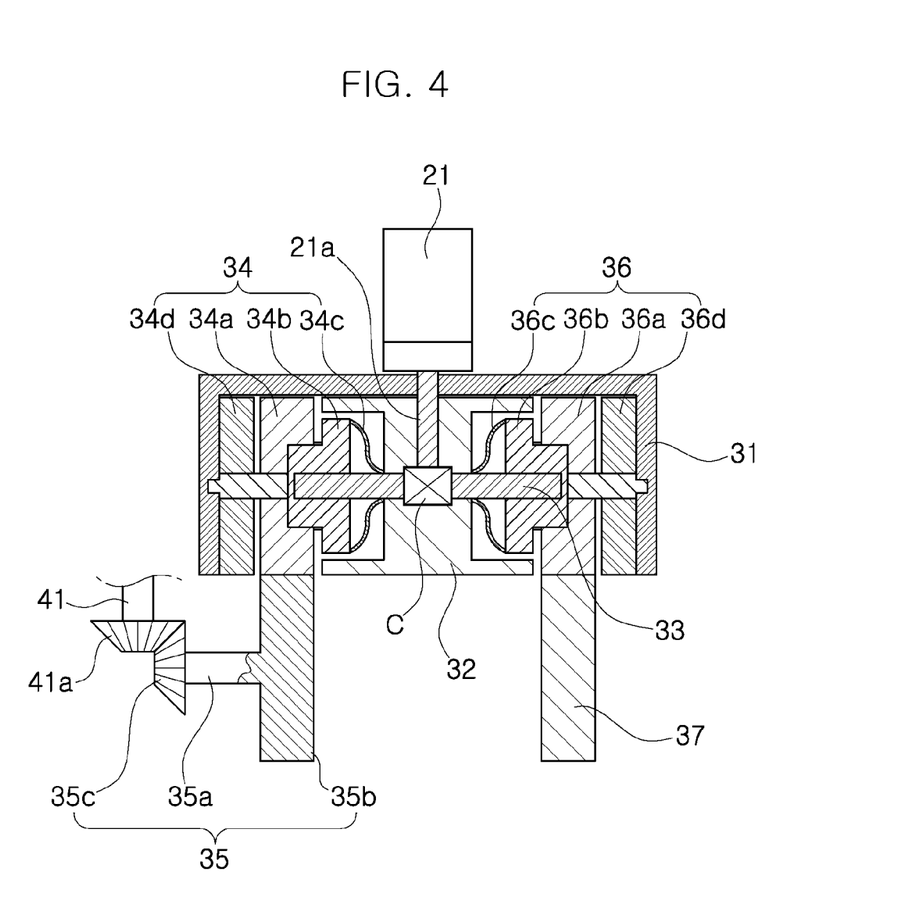
FIG. 4 is an enlarged schematic diagram illustrating the integrated operating apparatus for different types of gates according to embodiments of the present disclosure.

An integrated operating apparatus 30 for different types of gates according to embodiments of the present disclosure may be applied to a vehicle to which two types of gates are applied, for example, a purpose-built vehicle (PBV) 10. The integrated operating apparatus 30 may include a driving motor 21, a main shaft 33 rotated by the driving motor 21, a first clutch portion 34 installed at one side of the main shaft 33 and configured to selectively transmit power to a first gate, e.g., a sliding gate 11 of the PBV 10, and a second clutch portion 36 installed at the other side of the main shaft 33 and configured to selectively transmit power to a second gate, e.g., a bed gate 12 of the PBV 10. The first clutch portion 34 and the second clutch portion 36 include gears 34a and 36a and clutches 34b and 36b, which are installed to be engaged with each other. The first gate 11 and the second gate 12 are operated independently according to whether the gears 34a and 36a and the clutches 34b and 36b are engaged or released.

The sliding gate 11 may be applied to the PBV 10, and the bed gate 12 may be applied below the sliding gate 11. The sliding gate 11 and the bed gate 12 are operated to open or close using a single driving motor 21. In the PBV 10, the sliding gate 11 may serve as a display area or serve to open or close an inside of the PBV 10. The bed gate 12 may be installed in the form of a cargo bay of a truck, may serve as a structure against a collision, and may be opened to be used to load or unload personal mobility devices, such as wheelchairs, electric kickboards, and bicycles, or cargos. The sliding gate 11 and the bed gate 12 are operated independently. Here, the description of "the sliding gate 11 and the bed gate 12 are operated independently" means that the sliding gate 11 and the bed gate 12 may be discretely operated regardless of each other. In other words, only the sliding gate 11 may be operated, only the bed gate 12 may be operated, or both the sliding gate 11 and the bed gate 12 may be operated together.

A housing 31 may be configured to accommodate the integrated operating apparatus 30 and various components, which will be described below, therein.

The driving motor 21 may be installed at one side of the housing 31. A rotating force of the driving motor 21 may be transmitted to the integrated operating apparatus 30 provided inside of the housing 31 through a motor output shaft 21a of the driving motor 21.

A body 32 may be provided inside the housing 31 to support the main shaft 33. The body 32 may be formed to have a predetermined shape inside the housing 31.

Figure 5A:
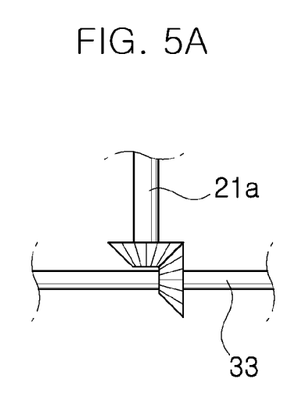
FIGS. 5A and 5B are schematic diagrams illustrating a coupling member between a motor output shaft and a main shaft in the integrated operating apparatus for different types of gates according to embodiments of the present disclosure.
Figure 5B:
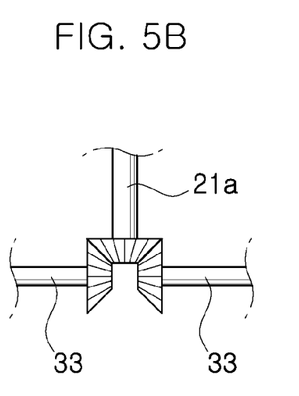

The main shaft 33 may be rotatably installed in the housing 31, passing through the body 32. The main shaft 33 may be rotated by the driving motor 21. The motor output shaft 21a may transmit the rotating force of the driving motor 21 to the main shaft 33 through a coupling member (C) including, for example, one or more bevel gears. For example, as shown in FIG. 5A, the main shaft 33 may be installed as a single shaft inside the housing 31 where the main shaft 33 is provided with a single bevel gear to be engaged with a bevel gear of the motor output shaft 21a. Alternatively, as shown in FIG. 5B, the main shaft 33 may be installed in a state in which left and right sides of the main shaft 33 are separated inside the housing 31 where each main shaft 33 is provided with a bevel gear at a distal end thereof to be engaged with a bevel gear of the motor output shaft 21a.

The first clutch portion 34 and the second clutch portion 36 are installed on one side and the other side, respectively, inside the housing 31. The first clutch portion 34 and the second clutch portion 36 are each exclusively responsible for operating the sliding gate 11 or the bed gate 12 of the PBV 10. That is, in embodiments of the present disclosure, the first clutch portion 34 may be dedicated to an operation of the sliding gate 11, and the second clutch portion 36 may be dedicated to an operation of the bed gate 12, or vice versa. The first clutch portion 34 and the second clutch portion 36 may transmit or block the rotating force of the driving motor 21, thereby operating the sliding gate 11 and the bed gate 12.

The first clutch portion 34 may include a first clutch 34b installed at the main shaft 33, a first gear 34a installed to be engaged with the first clutch 34b, a first spring 34c configured to elastically support the first clutch 34b to be engaged with the first gear 34a, and a first electromagnet 34d magnetized when power is applied and configured to separate the first clutch 34b from the first gear 34a.

The first clutch 34b may be installed at the main shaft 33 in a spline manner. Since the first clutch 34b is fastened to the main shaft 33 in a spline manner, the rotating force of the main shaft 33 may be transmitted to the first clutch 34b, and thus the first clutch 34b may slide in an axial direction of the main shaft 33.

The first gear 34a may be installed to be engaged with the first clutch 34b. That is, the first gear 34a and the first clutch 34b may be engaged or separated according to a position of the first clutch 34b on the main shaft 33. The first gear 34a may be installed at the main shaft 33 or installed at a separate shaft (a reference numeral is not given) installed inside the housing 31. When the first gear 34a is installed at the main shaft 33, the main shaft 33 may pass through the first gear 34a and may not be fastened thereto so that the rotating force is not transmitted from the main shaft 33 to the first gear 34a.

The first spring 34c elastically may support the first clutch 34b to allow the first clutch 34b to be engaged with the first gear 34a. The first spring 34c may be located between the first clutch 34b and the body 32, and the first clutch 34b may be pushed toward the first gear 34a by an elastic force of the first spring 34c so that the first clutch 34b and the first gear 34a are engaged. The first spring 34c may be provided as a disc spring.

As an opposite to the elastic force of the first spring 34c, the first electromagnet 34d may separate the first clutch 34b from the first gear 34a. When power is applied, the first electromagnet 34d may be magnetized to apply a repulsive force between the first electromagnet 34d and the first clutch 34b. When the first electromagnet 34d is magnetized, since a repulsive force should act between the first electromagnet 34d and the first clutch 34b, the first clutch 34b may be made of a permanent magnet.

A first output gear 35 may be provided at one side of the first clutch portion 34 to transfer the rotating force, which is transmitted through the first clutch portion 34, to the sliding gate 11.

The first output gear 35 may include an input gear portion 35b and an output gear portion 35c which are formed at both ends of a rotating shaft 35a. The input gear portion 35b may be engaged with the first gear 34a, and the output gear portion 35c may be engaged with a sliding gate driver 40 configured to drive the sliding gate 11.

The sliding gate driver 40 may include a sliding gate operating shaft 41 engaged with the first output gear 35 to be rotated and an interlocking shaft 42 engaged with the sliding gate operating shaft 41 and engaged with a rack gear 11a formed on an inner surface of the sliding gate 11. The sliding gate operating shaft 41 may include an input gear 41a engaged with the output gear portion 35c of the first output gear 35 and an output gear 41b engaged with the interlocking shaft 42. The interlocking shaft 42 may include an input gear 42a engaged with the output gear part 41b of the sliding gate operating shaft 41 and an output gear 42b engaged with the rack gear 11a. Since the rack gear 11a is preferably formed in each of upper and lower portions of the sliding gate 11 for a stable operation of the sliding gate 11, the output gear 42b may be formed at each of upper and lower ends of the interlocking shaft 42.

The second clutch portion 36 may have substantially the same structure as the first clutch portion 34.

That is, the second clutch portion 36 may include a second clutch 36b installed at the main shaft 33 in a spline manner, a second gear 36a installed to be engaged with the second clutch 36b, a second spring 36c configured to elastically support the second clutch 36b to be engaged with the second gear 36a, and a second electromagnet 36d magnetized when power is applied and configured to separate the second clutch 36b from the second gear 36a.

When the second clutch 36b and the second gear 36a are engaged, the second clutch portion 36 may transmit the rotating force of the driving motor 21 to the bed gate 12, and when the second clutch 36b and the second gear 36a are separated, the second clutch portion 36 may not transmit the rotating force of the driving motor 21 to the bed gate 12.

A second output gear 37 may be provided at one side of the second clutch portion 36 to transmit the rotating force, which is transmitted through the second clutch portion 36, to the bed gate 12. The second output gear 37 may be provided in the form of a spur gear and may be simultaneously engaged with the second gear 36a and a bed gate driver 50 configured to drive the bed gate 12, and thus when the second gear 36a is rotated, the second output gear 37 may operate to open or close the bed gate 12.

Figure 8:
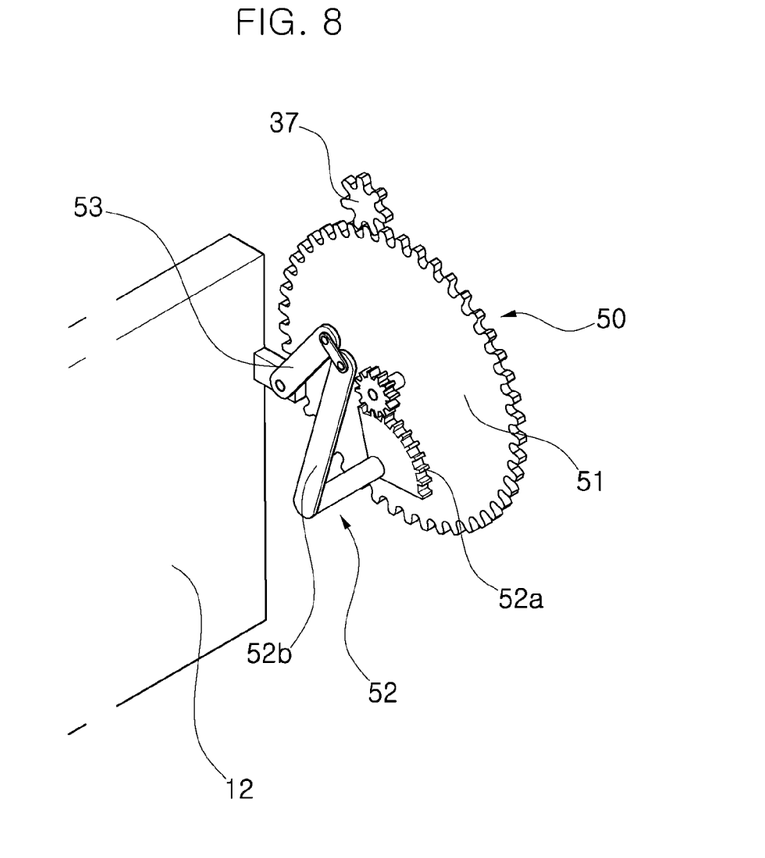
FIG. 8 is an enlarged schematic perspective diagram illustrating the bed gate driver according to embodiments of the present disclosure.

The bed gate driver 50 may include a reduction gear 51 engaged with the second output gear 37 which is engaged with the second gear 36a and a bed gate operating lever 52 having one side engaged with the reduction gear 51 and the other side linked and connected to the bed gate 12 by a connection lever 53 including a plurality of links. The reduction gear 51 may have a number of teeth on an output side smaller than a number of teeth on an input side and is engaged with the second output gear 37, thereby increasing a torque while converting the number of rotations of the second gear 36a into the number of rotations suitable for opening and closing the bed gate 12. The bed gate operating lever 52 may include a sector gear 52a engaged with the reduction gear 51 at one end and a lever 52b at the other end. Since there is a restriction in a space in which the bed gate operating lever 52 is installed in the PBV 10 and a rotation amount of the bed gate 12 is not large, teeth are formed only in a predetermined section of the sector gear 52a. The lever 52b may be connected to the connection lever 53 which is connected to the bed gate 12, and when the sector gear 52a is rotated, the lever 52b may rotate an upper end of the bed gate 12 through the connection link to open or close the bed gate 12.

An operation of the integrated operating apparatus for different types of gates according to embodiments of the present disclosure, which has the above-described configuration, will be described as follows.

In FIG. 4, the integrated operating apparatus 30 of embodiments of the present disclosure in a normal state, that is, a state in which power is not applied to the first electromagnet 34d and the second electromagnet 36d, is shown.

When power is not applied to the first electromagnet 34d, the first clutch 34b may become in a state of being engaged with the first gear 34a by the elastic force of the first spring 34c. Similarly, when the power is not applied to the second electromagnet 36d, the second clutch 36b also may be engaged with the second gear 36a by the second spring 36c.

In this state, when the driving motor 21 operates, the rotating force of the driving motor 21 may be transmitted to the first output gear 35 through the first clutch portion 34 and transmitted to the sliding gate 11 through the sliding gate driver 40 so that the sliding gate 11 is operated to be opened or closed. When the first output gear 35 is rotated, the sliding gate operating shaft 41 and the interlocking shaft 42 may be rotated together. As the interlocking shaft 42 is rotated, the interlocking shaft 42 may be engaged with the rack gear 11a of the sliding gate 11 to move the rack gear 11a so that the sliding gate 11 is opened or closed.

Simultaneously, the rotating force of the driving motor 21 may be transmitted to the second output gear 37 through the second clutch portion 36 and transmitted to the bed gate 12 through the bed gate driver 50 so that the bed gate 12 is opened or closed. When the rotating force of the driving motor 21 is transmitted to the second output gear 37 through the second clutch portion 36, the reduction gear 51 may be rotated. Due to the rotation of the reduction gear 51, the sector gear 52a of the bed gate operating lever 52 may be rotated, and the lever 52b may be rotated and thus the connection lever 53 may be pushed or pulled so that the upper end of the bed gate 12 is pushed or pulled, and thus the bed gate 12 may be opened or closed.

Meanwhile, when only one of the sliding gates 11 and the bed gate 12 should be operated, by applying power to either the first electromagnet 34d or the second electromagnet 36d, any one of the first clutch 34b and the second clutch 36b may be released.

Figure 6:
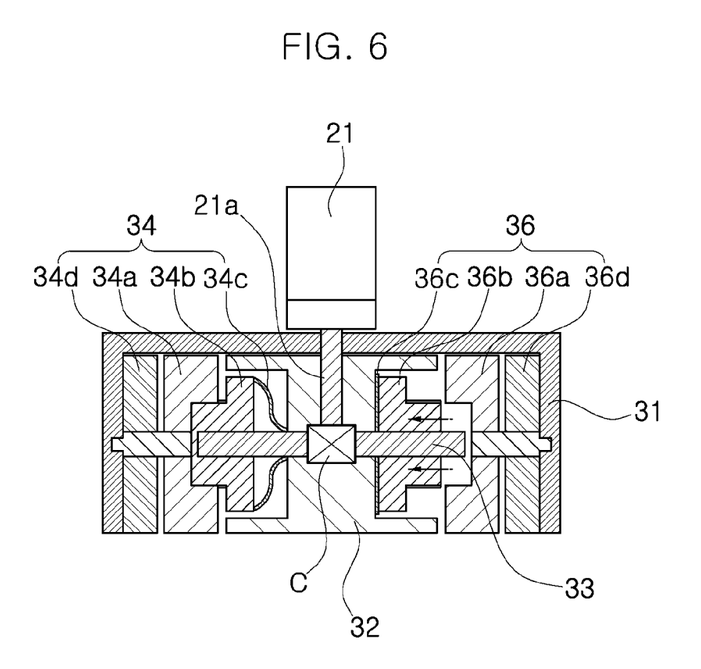
FIG. 6 is an enlarged schematic diagram illustrating a state in which only the sliding gate is operated in the integrated operating apparatus for different types of gates according to embodiments of the present disclosure.

In FIG. 6, a state of the integrated operating apparatus 30 for operating only the sliding gate 11 and not operating the bed gate 12 is shown.

In order to operate only the sliding gate 11 and not operate the bed gate 12, the second clutch portion 36 configured to operate the bed gate 12 may be released. To this end, power may be applied to the second electromagnet 36d. When the power is applied to the second electromagnet 36d, a repulsive force may be applied between the second electromagnet 36d and the second clutch 36b. Accordingly, the second clutch 36b may slide to be spaced apart from the second electromagnet 36d on the main shaft 33 and may be separated from the second gear 36a. When the power is applied to the driving motor 21 in a state in which the second clutch 36b and the second gear 36a are separated, the rotating force of the driving motor 21 may be transmitted to the sliding gate 11 through the first clutch portion 34 so that the sliding gate 11 is opened or closed. However, since the second clutch 36b and the second gear 36a are separated from each other, when the second clutch 36b of the second clutch portion 36 is rotated by the rotating force of the driving motor 21, the second gear 36a may not be rotated so that the bed gate 12 is not operated.

Figure 7:
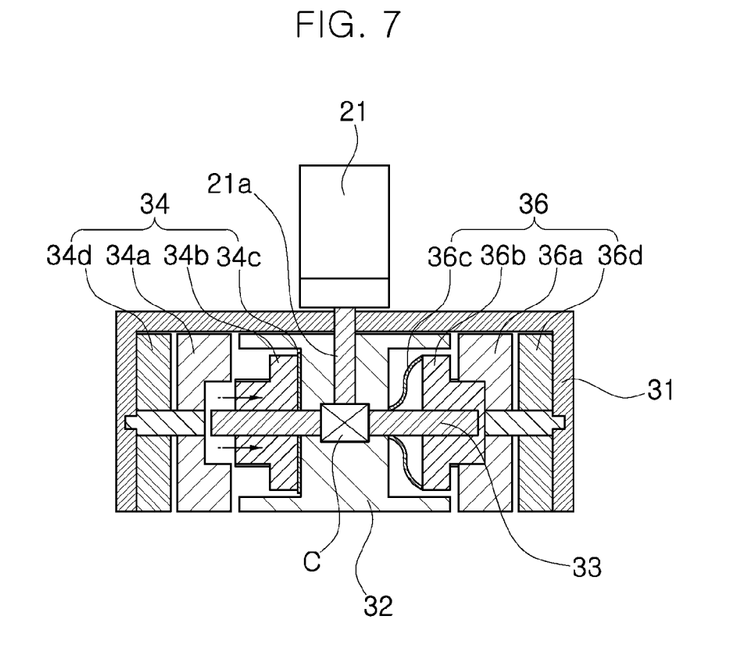
FIG. 7 is an enlarged schematic diagram illustrating a state in which only the bed gate is operated in the integrated operating apparatus for different types of gates according to embodiments of the present disclosure.

As the opposite of FIG. 6, a case in which the sliding gate 11 is not operated and only the bed gate 12 is operated is shown in FIG. 7.

In order to operate only the bed gate 12, power may be applied to the first electromagnet 34d. When the power is applied to the first electromagnet 34d, a repulsive force may be applied between the first electromagnet 34d and the first clutch 34b. Accordingly, the first clutch 34b may be moved in a direction spaced apart from the first gear 34a and may be separated therefrom. In this state, when the power is applied to the driving motor 21, the rotating force of the driving motor 21 may be transmitted only to the bed gate 12 through the second clutch portion 36. Since the rotating force is transmitted only to the bed gate 12 without being transmitted to the sliding gate 11, only the bed gate 12 may be operated to be opened or closed.

In accordance with an integrated operating apparatus for different types of gates according to embodiments of the present disclosure, which has the above-described configuration, a sliding gate and a bed gate may be opened or closed using a single driving motor, and thus the number of operating apparatuses required to operate the two gates may be reduced so that a weight of a vehicle can be reduced and the manufacturing cost may be reduced.

In addition, since the two gates may be simultaneously operated through the single operating apparatus, it is advantageous to secure a space in the vehicle.

While embodiments of the present disclosure have been described with reference to the accompanying drawings, it will be apparent to those skilled in the art that various changes and modifications can be made without departing from the spirit and scope of embodiments of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An apparatus comprising:
   a driving motor;
   a main shaft rotatable by the driving motor;
   a first clutch portion at a first side of the main shaft and configured to selectively transmit power to a first gate of a vehicle, the first clutch portion comprising a first clutch and a first gear selectively engaged with each other;
   a second clutch portion at a second side of the main shaft and configured to selectively transmit power to a second gate of the vehicle, the second clutch portion comprising a second clutch and a second gear selectively engaged with each other, wherein the first gate and the second gate are configured to operate independently of each other based on the first clutch portion being in an engaged state or a released state and the second clutch portion being in an engaged state or a released state, and
   wherein the second gate is a bed gate; and
   a bed gate driver configured to open and close the bed gate,
   wherein the second gear is connected to the bed gate driver,
   wherein the bed gate has a lower portion that is hingedly coupled to the vehicle, and
   wherein the bed gate driver comprises:
      a reduction gear engaged with an output gear that is engaged with the second gear, and
      a bed gate operating lever mechanism having a first portion engaged with the reduction gear and a second portion connected to the bed gate by a connection lever.

2. The apparatus of claim 1, further comprising a body, wherein the main shaft is disposed in the body, and wherein the first clutch portion and the second clutch portion each are disposed a respective side of the body.

3. The apparatus of claim 1, wherein:
   the first clutch is installed on the main shaft in a splined manner;
   the first gear is selectively engaged with the first clutch and configured to operate the first gate when engaged with the first clutch;
   the first clutch portion further comprises:
      a first spring configured to elastically urge the first clutch toward the first gear; and
      a first electromagnet configured to slide the first clutch on the main shaft to separate the first clutch from the first gear in response to power being applied to magnetize the first electromagnet to move the first clutch portion to the released state, and
   wherein the second clutch is installed on the main shaft in a splined manner;
   the second gear is selectively engaged with the second clutch and configured to operate the bed gate when engaged with the second clutch;
   the second clutch portion further comprises:
      a second spring configured to elastically urge the second clutch toward the second gear; and
      a second electromagnet configured to slide the second clutch on the main shaft to separate the second clutch from the second gear in response to power being applied to magnetize the second electromagnet to move the second clutch portion to the released state.

4. The apparatus of claim 3,
   wherein the first clutch comprises a first permanent magnet configured to generate a repulsive force with respect to the first electromagnet in response to the first electromagnet being magnetized, and
   wherein the second clutch comprises a second permanent magnet configured to generate a repulsive force with respect to the second electromagnet in response to the second electromagnet being magnetized.

5. The apparatus of claim 1,
   wherein the first gate is a sliding gate, and
   wherein the first gear is connected to a sliding gate driver configured to operate the sliding gate so that the sliding gate is opened and closed in a sliding manner.

6. The apparatus of claim 5, further comprising a rack gear inside the sliding gate, wherein the sliding gate driver comprises:
   a sliding gate operating shaft engaged with the first clutch portion and rotatable by the first clutch portion; and an interlocking shaft engaged with the sliding gate operating shaft and engaged with the rack gear.

7. The apparatus of claim 6, wherein:
the sliding gate operating shaft comprises a first input gear portion and a first output gear portion connected to the first input gear portion;
the first output gear portion is engaged with the first gear;
the first output gear portion is engaged with the interlocking shaft; and
the interlocking shaft comprises a second input gear portion engaged with the sliding gate operating shaft and a second output gear portion engaged with the rack gear.

8. The apparatus of claim 6, wherein:
the rack gear comprises two rack gears each provided on a respective one of an upper portion and a lower portion of the sliding gate; and
an upper end and a lower end of the interlocking shaft are engaged with the rack gears.

9. The apparatus of claim 1, wherein the bed gate operating lever mechanism further comprises:
a sector gear engaged with the reduction gear; and
a lever connected to the connection lever.

10. The apparatus of claim 9, wherein the reduction gear has a first number of teeth on an output side and a second number of teeth on an input side, wherein the first number of teeth is smaller than the second number of teeth.

11. The apparatus of claim 9, wherein the connection lever comprises a plurality of links connected to the bed gate.

12. An apparatus comprising:
a driving motor comprising a motor output shaft;
a main shaft configured to receive a rotating force of the driving motor through the motor output shaft and a coupling member;
a first clutch portion at a first side of the main shaft and configured to selectively transmit power to a first gate of a vehicle; and
a second clutch portion at a second side of the main shaft and configured to selectively transmit power to a second gate of the vehicle,
wherein each of the first clutch portion and the second clutch portion comprises a gear and a clutch selectively engaged with each other,
wherein the first gate and the second gate are configured to operate independently of each other according to whether the gear and the clutch of the first clutch portion and the gear and the clutch of the second clutch portion, respectively, are in an engaged state or a released state, and
wherein the second gate is a bed gate; and
a bed gate driver configured to open and close the bed gate,
wherein the gear of the second clutch portion is connected to the bed gate driver,
wherein the bed gate has a lower portion that is hingedly coupled to the vehicle, and
wherein the bed gate driver comprises:
a reduction gear engaged with an output gear that is engaged with the gear of the second clutch portion, and
a bed gate operating lever mechanism having a first portion engaged with the reduction gear and a second portion connected to the bed gate by a connection lever.

13. The apparatus of claim 12, wherein the coupling member comprises one or more bevel gears.

14. The apparatus of claim 13, wherein the one or more bevel gears comprises a single bevel gear of the main shaft and a bevel gear of the motor output shaft, and wherein the single bevel gear is engaged with the bevel gear of the motor output shaft.

15. The apparatus of claim 13, wherein the main shaft is separated into a plurality of main shafts, each of the main shafts comprising a bevel gear of said one or more bevel gears to be engaged with a bevel gear of said one or more bevel gears of the motor output shaft.

16. An apparatus comprising:
a driving motor comprising a motor output shaft;
a body;
a main shaft in the body, the main shaft being configured to be rotated by the driving motor through a coupling member engaged with the motor output shaft;
a first clutch portion at a first side of the main shaft and configured to selectively transmit power to a first gate of a vehicle;
a second clutch portion at a second side of the main shaft and configured to selectively transmit power to a second gate of the vehicle;
a first gate driver configured to drive the first gate to be opened or closed; and
a second gate driver configured to drive the second gate to be opened or closed,
wherein each of the first clutch portion and the second clutch portion comprises a gear and a clutch that are engageable with each other,
wherein the first gate and the second gate are configured to operate independently of each other through the first gate driver and the second gate driver according to whether the gear and the clutch of the first clutch portion and the gear and the clutch of the second clutch portion, respectively, are in an engaged state or a released state,
wherein the second gate is a bed gate,
wherein the gear of the second clutch portion is connected to the second gate driver,
wherein the bed gate has a lower portion that is hingedly coupled to the vehicle, and wherein the second gate driver comprises:
a reduction gear engaged with an output gear that is engaged with the gear of the second clutch portion, and
a bed gate operating lever mechanism having a first potion engaged with the reduction gear and a second portion connected to the bed gate by a connection lever.

17. The apparatus of claim 16, wherein:
the coupling member comprises a single bevel gear on the main shaft and a bevel gear on the motor output shaft.

18. The apparatus of claim 16, wherein:
the main shaft comprises two main shafts; and
the coupling member comprises bevel gears on distal ends of the main shafts and a bevel gear on the motor output shaft.

19. The apparatus of claim 16, wherein the first gate is a sliding gate.

20. The apparatus of claim 16, wherein the gear of the first clutch portion is connected to the first gate driver.

* * * * *